United States Patent
Golyshko et al.

(10) Patent No.: US 12,452,491 B2
(45) Date of Patent: Oct. 21, 2025

(54) AUTOMATIC PARENTAL CONTROL BASED ON AN IDENTIFIED AUDIENCE

(71) Applicant: ROKU, INC., San Jose, CA (US)

(72) Inventors: Philip Golyshko, Westminster, CO (US); Ramesh Babu Anaparti, Leander, TX (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/344,451

(22) Filed: Jun. 29, 2023

(65) Prior Publication Data
US 2025/0008187 A1 Jan. 2, 2025

(51) Int. Cl.
| H04N 21/454 | (2011.01) |
| H04N 21/422 | (2011.01) |
| H04N 21/442 | (2011.01) |
| H04N 21/475 | (2011.01) |

(52) U.S. Cl.
CPC ... *H04N 21/4542* (2013.01); *H04N 21/42203* (2013.01); *H04N 21/44218* (2013.01); *H04N 21/4753* (2013.01)

(58) Field of Classification Search
None
See application file for complete search history.

(56) References Cited

U.S. PATENT DOCUMENTS

| 8,924,999 B1 * | 12/2014 | Santangelo | H04N 21/6582 725/9 |
| 2008/0217402 A1 | 9/2008 | Lemmers et al. | |
| 2013/0179698 A1 * | 7/2013 | Woods | H04N 21/42209 713/300 |
| 2016/0112760 A1 | 4/2016 | Kosseifi et al. | |
| 2020/0145723 A1 * | 5/2020 | Vaughn | H04N 21/25883 |
| 2021/0118276 A1 * | 4/2021 | Matsuzawa | G06F 1/163 |
| 2024/0193167 A1 * | 6/2024 | Alexander | G06F 16/24573 |

OTHER PUBLICATIONS

Alanazi et al., "Towards a Low-Cost Solution for Gait Analysis Using Millimeter Wave Sensor and Machine Learning"; MPDI, Sensors (Year: 2022).*
Extended European Search Report for European Application No. 24183766.5, mailed on Nov. 13, 2024, 7 pages.

* cited by examiner

Primary Examiner — James R Marandi
(74) Attorney, Agent, or Firm — Sterne, Kessler, Goldstein &Fox P.L.L.C.

(57) ABSTRACT

Disclosed herein are system, apparatus, article of manufacture, method and/or computer program product embodiments, and/or combinations and sub-combinations thereof, for automatically control parental settings based on audience detected. An example embodiment operates by detecting an audience within a vicinity of a media device based on identification information of the audience received by the media device, determining a category of the audience with a user identification system based on the identification information, identifying a parental control setting for the audience based on the category of the audience, determining a category of a content played by the media device, and applying the identified parental control setting to the media device based on the category of the content.

20 Claims, 10 Drawing Sheets

AUTOMATIC PARENTAL CONTROL BASED ON AN IDENTIFIED AUDIENCE

BACKGROUND

Field

This disclosure is generally directed to automatic parental control based on an identified audience within a vicinity of a media device, and more particularly to automatically applying parental control settings to a media device according to a category of the identified audience and a category of a content played on the media device.

SUMMARY

Provided herein are system, apparatus, article of manufacture, method and/or computer program product embodiments, and/or combinations and sub-combinations thereof, for automatically applying parental control settings to a media device according to an identified audience within a vicinity of the media device. In some embodiments, one or more users within a vicinity of a media device can be detected by one or more sensing modules of the media device. The one or more sensing modules can continuously or periodically monitor the vicinity of the media device to detect any users. The one or more sensing modules can include one or more millimeter wave sensing modules to capture one or more gaits of the users and/or audio sensing modules to capture one or more utterances of the users. The captured gaits and/or utterances of the users can be used as identification information to identify the users.

In some embodiments, based on the captured gaits and/or utterances, a user identification system can identify the detected users and determine categories of the detected users. The categories can include children under thirteen, children under seventeen, parents, adults, a member or household, guests, etc. A parental control system can identify one or more parental control settings based on the determined categories. In some embodiments, each of the determined categories can have a priority and the parental control system can identify a parental control setting for the category having the highest priority.

In some embodiments, the media device can receive content to be played on a display device connected to the media device. The received content can include category labels that can indicate inappropriateness for various categories of audiences. Based on the category label of the content, the parental control system can apply the identified parental control setting to the media device and can limit children's access to inappropriate content.

An example embodiment of a system can include a storage module and at least one processor each coupled to the storage module and configured to perform various operations to automatically apply parental control settings to the media device. In an example, the at least one processor can be configured to detect an audience within a vicinity of a media device based on identification information of the audience received by the media device. Afterwards, the at least one processor can be configured to determine a category of the audience with a user identification system based on the identification information. In addition, the at least one processor can be configured to identify a parental control setting for the audience based on the category of the audience. The at least one processor can be further configured to determine a category of a content played by the media device and apply the identified parental control setting to the media device based on the category of the content.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
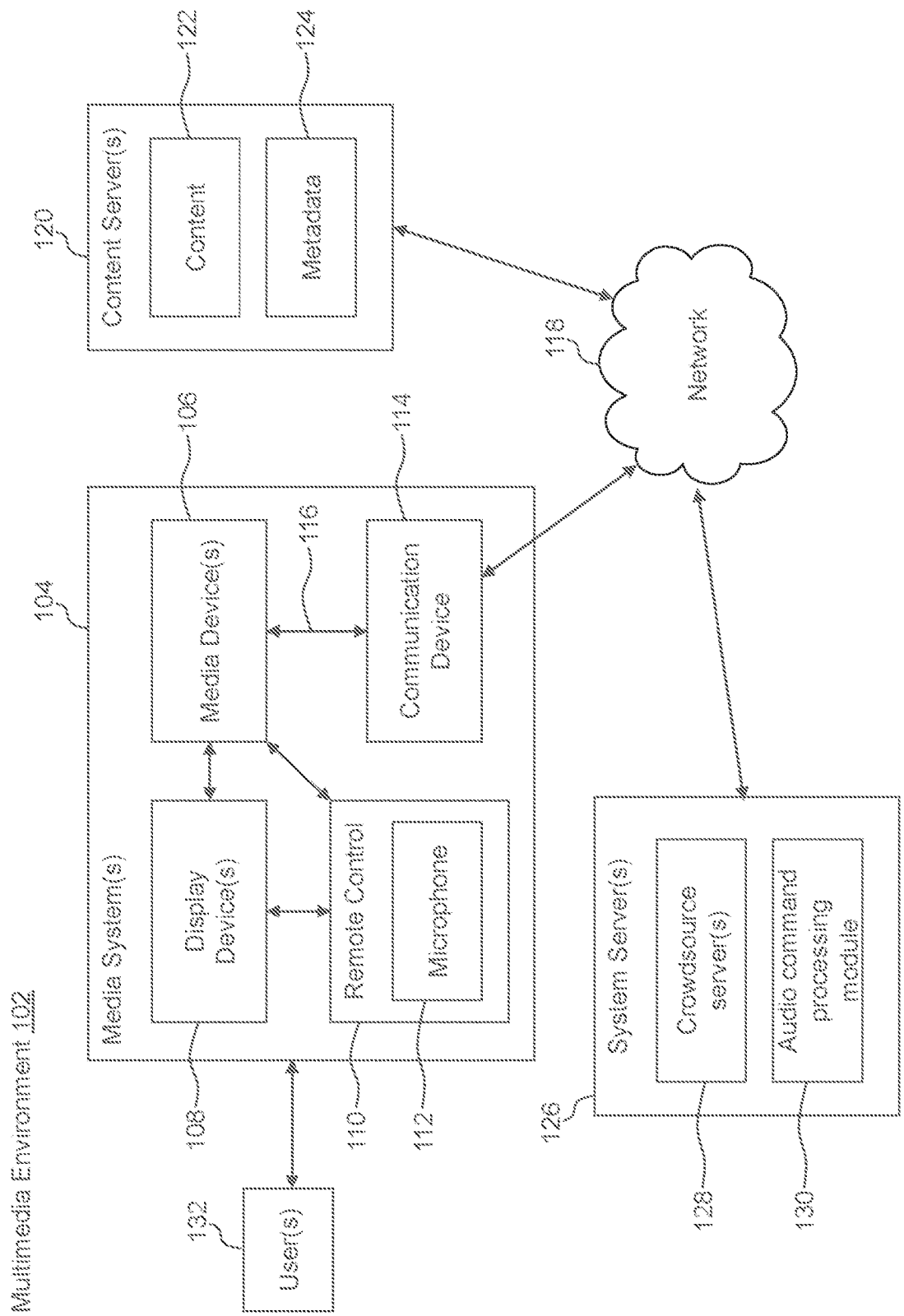
FIG. 1 illustrates a block diagram of a multimedia environment, according to some embodiments.

With the technology advances for multimedia and communication, many types of media content are readily available for streaming and/or display. For example, media content can be delivered via various communication technologies so that the media content can be easily accessed, watched, or listened to anywhere and anytime by both children and adults. Compared to the early days when media content may be limited to printed publications or delivered by radio, current media content can be available in various forms such as videos, movies, advertisement, audio files, text, etc., and any combination thereof. In general, media content may be referred to as content, which may include one or more content items, where one content item can include a plurality of scenes and each scene can include a sequence of frames. How to efficiently and accurately deliver appropriate content to interested viewers, users, or audiences, can be of value to those parties as well as the content creators. Viewers, audiences, and users (and similar parties and entities) are used interchangeably in the current description.

Television (TV) offers viewers access to content via subscription to cable or satellite services or through over-the-air broadcasts. In general, content, such as multimedia content, can be delivered from a content source device operated by a content provider to millions of viewers. The content can have different categories or ratings for appropriate audiences. For example, the categories of content can include general audience (G), parental guidance suggested (PG), parents strongly cautioned (PG-13), restricted (R), and adults only (NC-17). The content rated PG-13 can include material not appropriate for children under thirteen. The content rated R can require accompanying parent or adult guardian for children under seventeen. The content rated NC-17 can include material inappropriate for children seventeen and under. The inappropriate content can include violence, nudity, inappropriate language, and other inappropriate materials.

Parents/adults can restrict inappropriate content from the children with parental control settings. For example, after the parents turn on the parent control settings on a TV, the TV can present a PIN entry prompt on the screen when any inappropriate content is played on the TV. However, the parents may forget sometimes to turn on the parent control settings. Inappropriate content (e.g., inappropriate advertisements, inappropriate scenes in a movie) may be played to the children. The parents may not be able to skip or restrict the inappropriate content in time. Additionally, when the parents are watching TV programs that includes inappropriate content for the children, the children may join and come within the vicinity of the TV. The parents may not be able to switch channels or turn on the parental control settings in time to have appropriate content for the children. Moreover, a family may have multiple children at different ages. A content may be inappropriate for one child but appropriate for another child. For example, a content rated PG-13 may be inappropriate for a ten-year old child but may be appropriate for a fifteen-year old child. A single tier of parental control settings may have too much restriction than needed for an older child.

Provided herein are system, apparatus, device, method and/or computer program product embodiments, and/or combinations and sub-combinations thereof, for automatically applying parental control settings based on an identified audience to efficiently and timely limit inappropriate content to the children. In some embodiments, a user may come within a spatial vicinity of a media device and the user can be detected by a sensor. The spatial vicinity can be a spatial limit, such as fifteen feet from the media device or within the room of the media device. The sensor can capture identification information of the user. The identification information can include a gait and/or an utterance of the user. Based on the identification information, a category for the user can be determined. The category can include adult, man, woman, children under seventeen, children under thirteen, toddler, and other categories. A parental control setting for the user can be identified based on the category of the user. The identified parental control setting can be automatically applied to the media device based on the category of the content. With the parental control setting, the media device can automatically pause the content on the media device and display a PIN entry prompt when inappropriate content for the user (e.g., a child) plays on the media device. Additionally, the parental control settings can have different tiers with different priorities. For example, if two children come within the vicinity of the media devices and two parental control settings are identified, the parental control setting having a higher priority can be automatically applied to the media device.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 including a parental control system to automatically applying parental control settings to a media device based on an identified audience, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media system(s) 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content, such as content 122.

Each media system 104 may include one or more media device(s) 106 each coupled to one or more display device(s) 108. It is noted that terms such as "coupled," "connected to," "attached," "linked," "combined" and similar terms may refer to physical, electrical, magnetic, logical, etc., connections, unless otherwise specified herein.

Media device(s) 106 may be a streaming media device, a streaming set-top box (STB), cable and satellite STB, a DVD or BLU-RAY device, an audio/video playback device, a cable box, and/or a digital video recording device, to name just a few examples. Display device(s) 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device(s) 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device(s) 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system(s) 104 may include a remote control 110. The remote control 110 can be any component, part, apparatus and/or method for controlling the media device(s) 106 and/or display device(s) 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device(s) 106 and/or display device(s) 108 using cellular, Bluetooth, infrared, etc., or any combination thereof. The remote control 110 may include a microphone 112, which is further described below.

The multimedia environment 102 may include a plurality of content server(s) 120 (also called content providers, channels, or sources). Although only one content server 120 is shown in FIG. 1, in practice the multimedia environment 102 may include any number of content server(s) 120. Each content server 120 may be configured to communicate with network 118. Each content server 120 may be configured to communicate with network 118. Content server(s) 120, media device(s) 106, and display device(s) 108 may be collectively referred to as a media system, which may be an extension of media system(s) 104. In some embodiments, a media system may include system server(s) 126 as well.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. Content 122 may be the source displayed on display device(s) 108.

In some embodiments, metadata 124 comprises data about content 122. For example, metadata 124 may include associated or ancillary information indicating or related to categories of the materials in the content 122, writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index. In some embodiments, content 122 can include a plurality of content items, and each content item can include a plurality of scenes and frames having corresponding metadata (see FIG. 3).

The multimedia environment 102 may include one or more system server(s) 126. The system server(s) 126 may operate to support the media device(s) 106 from the cloud. It is noted that the structural and functional aspects of the system server(s) 126 may wholly or partially exist in the same or different ones of the system server(s) 126. System server(s) 126 and content server(s) 120 together may be referred to as a media server system. An overall media system may include a media server system and media system(s) 104. In some embodiments, a media system may refer to the overall media system including the media server system and media system(s) 104.

The media device(s) 106 may exist in thousands or millions of media systems 104. Accordingly, the media device(s) 106 may lend themselves to crowdsourcing embodiments and, thus, the system server(s) 126 may include one or more crowdsource server(s) 128.

For example, using information received from the media device(s) 106 in the thousands and millions of media systems 104, the crowdsource server(s) 128 may identify similarities and overlaps between closed captioning requests issued by different user(s) 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie. In some embodiments, crowdsource server(s) 128 can be located at content server(s) 120. In some embodiments, some part of content server(s) 120 functions can be implemented by system server(s) 126 as well.

The system server(s) 126 may also include an audio command processing module 130. As noted above, the remote control 110 may include a microphone 112. The microphone 112 may receive audio data from user(s) 132 (as well as other sources, such as the display device(s) 108). In some embodiments, the media device(s) 106 may be audio responsive, and the audio data may represent verbal commands from the user(s) 132 to control the media device(s) 106 as well as other components in the media system(s) 104, such as the display device(s) 108.

In some embodiments, the audio data received by the microphone 112 in the remote control 110 is transferred to the media device(s) 106, which is then forwarded to the audio command processing module 130 in the system server(s) 126. The audio command processing module 130 may operate to process and analyze the received audio data to recognize the user(s) 132's verbal command. The audio command processing module 130 may then forward the verbal command back to the media device(s) 106 for processing.

Figure 2:
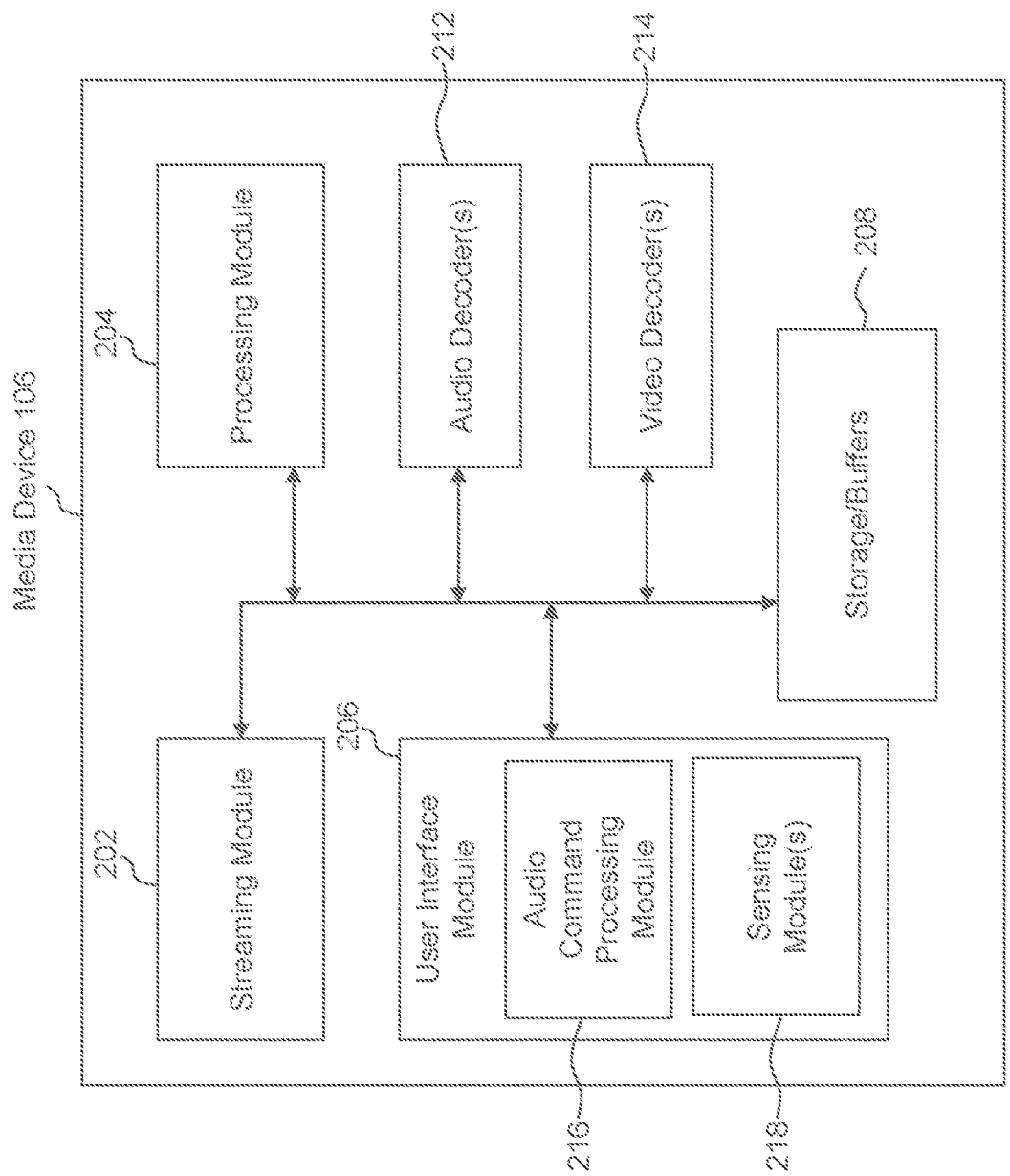
FIG. 2 illustrates a block diagram of a streaming media device, according to some embodiments.

In some embodiments, the audio data may be alternatively or additionally processed and analyzed by an audio command processing module 216 in the media device(s) 106 (see FIG. 2). The media device(s) 106 and the system server(s) 126 may then cooperate to pick one of the verbal commands to process (either the verbal command recognized by the audio command processing module 130 in the system server(s) 126, or the verbal command recognized by the audio command processing module 216 in the media device(s) 106).

FIG. 2 illustrates a block diagram of an example media device(s) 106, according to some embodiments. Media device(s) 106 may include a streaming module 202, processing module 204, storage/buffers 208, and user interface module 206. As described above, user interface module 206 may include audio command processing module 216.

Figure 5:
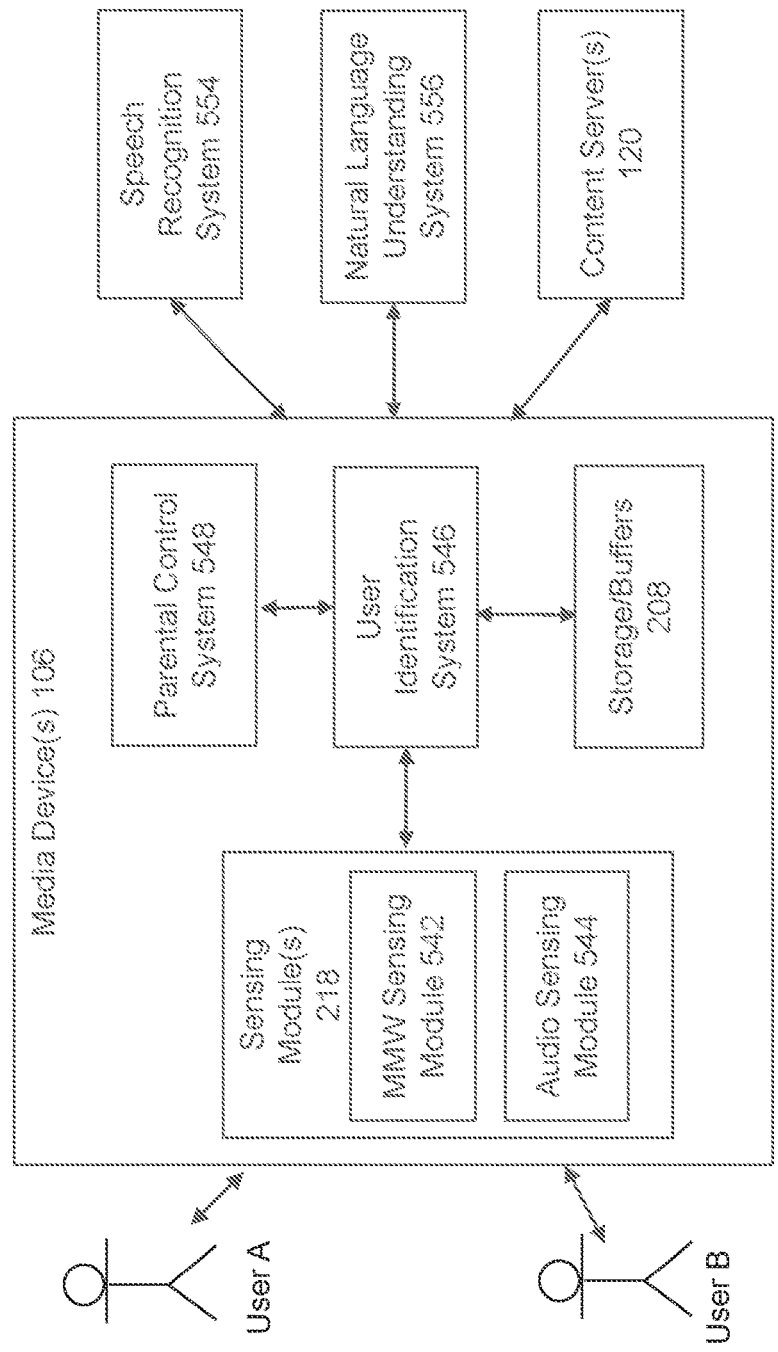
FIG. 5 illustrates a block diagram of a system for audience identification and automatic parental controls for the identified audience, according to some embodiments.

In some embodiments, user interface module 206 may further include one or more sensing module(s) 218, such as millimeter waver (MMW) sensing module 542 and audio sensing module 544 (see FIG. 5). Sensing module(s) 218 can include MMW sensors, microphones, cameras, infra-red sensors, touching sensors, to name just some examples. Sensing module(s) 218 can capture sensing signals when user(s) 132 enter within a vicinity of sensing module(s) 218. The sensing signals can include movements, gaits, image signals, audio signals, infrared signals, and touching signals, to name just some examples. In some embodiments, sensing module(s) 218 can be integrated into media device(s) 106. In some embodiments, sensing module(s) 218 can be integrated to display device(s) 108, remote control 110, or any devices used by user(s) 132 to interact with media systems 104. In some embodiments, sensing module(s) 218 can be stand-alone modules outside of media device(s) 106, display device(s) 108, remote control 110, and devices used by user(s) 132. Implemented as a stand-alone device, sensing module(s) 218 may be physically located within the vicinity of media device(s) 106 to detect audiences. Media device(s) 106 can receive the sensing signals captured by sensing module(s) 218 and identify one or more user(s) 132 within the vicinity of media device(s) 106 based on identification information in the captured sensing signals.

The media device(s) 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H 265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user(s) 132 may interact with the media device(s) 106 via, for example, the remote control 110. For example, the user(s) 132 may use the remote control 110 to interact with the user interface module 206 of the media device(s) 106 to select content, such as a movie, TV show, music, book, application, game, etc. The streaming module 202 of the media device(s) 106 may request the selected content from the content server(s) 120 over the network 118. The content server(s) 120 may transmit the requested content to the streaming module 202. The media device(s) 106 may transmit the received content to the display device(s) 108 for playback to the user(s) 132.

In streaming embodiments, the streaming module 202 may transmit the content to the display device(s) 108 in real time or near real time as it receives such content from the content server(s) 120. In non-streaming embodiments, the media device(s) 106 may store the content received from content server(s) 120 in storage/buffers 208 for later playback on display device(s) 108.

Figure 3:
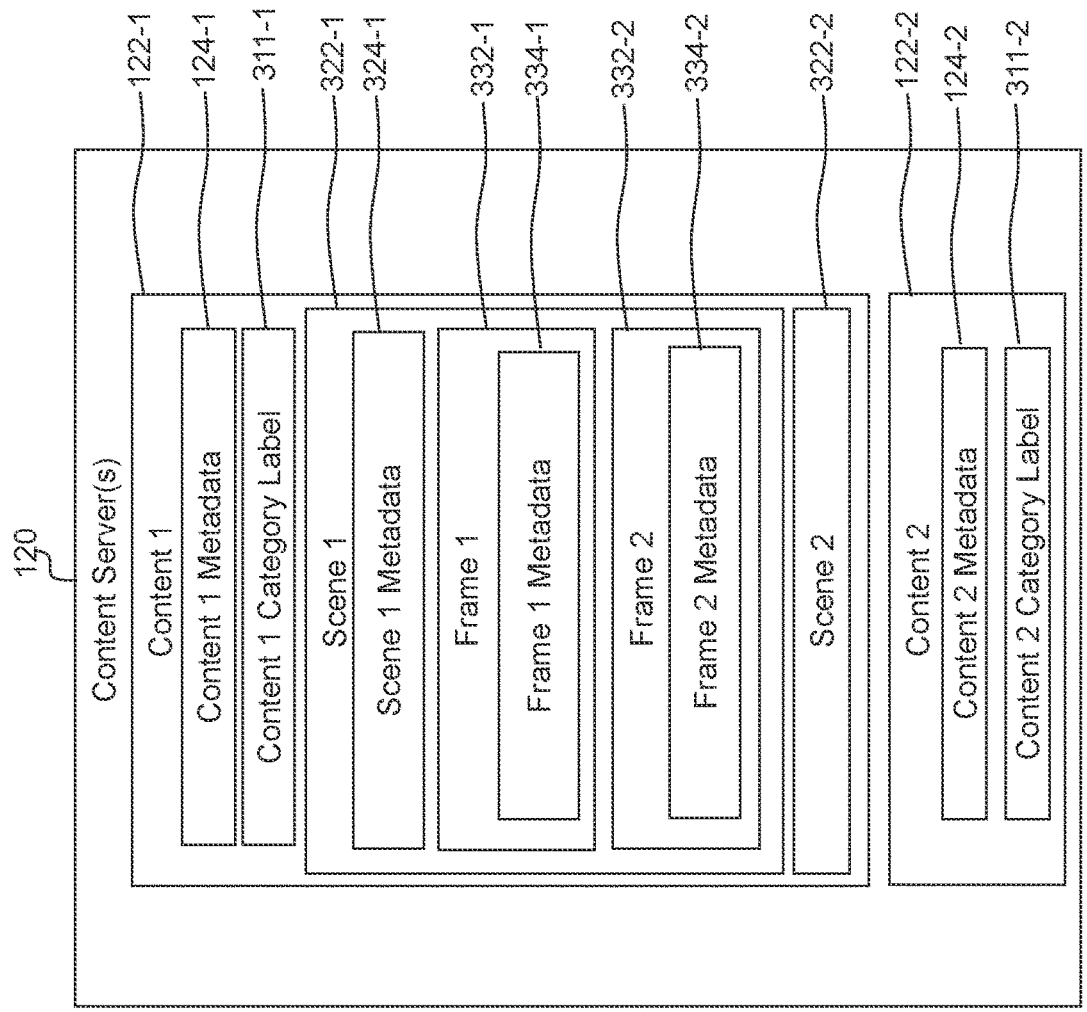
FIG. 3 illustrates a block diagram of a content server having category labels for a content, according to some embodiments.

FIG. 3 illustrates a block diagram of content server(s) 120 having category labels for content items, according to some embodiments. As shown in FIG. 3, content server(s) 120 can include a plurality of content items, such as content 122-1 and content 122-2. Content 122-2 can have a similar structure as content 122-1. Though FIG. 3 illustrates two content items on content server(s) 120, content server(s) 120 can include more than two content items having a similar structure as content 122-1. The discussion of elements of content 122-1 applies to content 122-2, unless mentioned otherwise. And like reference numerals generally indicate identical, functionally similar, and/or structurally similar elements.

In some embodiments, as shown in FIG. 3, content 122-1 can include content metadata 124-1 and content category label 311-1. Similarly, content 122-1 can include content metadata 124-2 and content category label 311-2. In some embodiments, content 122-1 can include a plurality of scenes, such as scene 322-1 and scene 322-2. Content 122-2 can have a similar structure as content 122-1. In some embodiments, each scene can include a plurality of frames. As an example, scene 322-1 can include scene metadata 324-1, frame 332-1, and frame 332-2. Scene 322-2 can have a similar structure as scene 322-1. Frame 332-1 can further include frame metadata 334-1. Similarly, frame 332-2 can further include frame metadata 334-2.

In some embodiments, frame metadata 334-1 and 334-2, scene metadata 324-1, and content metadata 124-1 and 124-2 may include associated or ancillary information similar to metadata 124 as described above. In some embodiments, the associated and ancillary information can be generated by the content creators or by content server(s) 120. In some embodiments, frame metadata 334-1 and 334-2 may include color contrast, brightness, histogram of color spectrum, a number of objects, a trajectory of objects contained in frames 332-1 and 332-2, or a frame feature contained in frames 332-1 and 332-2. Scene metadata 324-1 related to scene 322-1 may include information about objects, people, places, actions, caption data text of scene 322-1, and audio information related to scene 322-1. In some embodiments, Content metadata 124-1 and 124-2 related to respective content 122-1 and 122-2 can include information about respective genre of the content, keywords, a description, and reviews of content 122-1 and 122-2.

Category labels 311-1 and 311-2 can indicate inappropriateness of respective content 122-1 and 122-2 for certain audiences (e.g., children). In some embodiments, category labels 311-1 and 311-2 can include respective rating of content 122-1 and 122-2, such as PG, PG-13, R, and NC-17, as well as other labels about content 122-1 and 122-2, such as violence, nudity, inappropriate language, and other inappropriate materials. In some embodiments, category labels 311-1 and 311-2 can be provided by the content provider and can be included in respective content 122-1 and 124-1. In some embodiments, category labels 311-1 and 311-2 can be collected from user's report or feedback and included in respective content 122-1 and 124-1. In some embodiments, one or more labelers can view content 122-1 and 122-2 and label content 122-1 and 122-2 with respective category labels 311-1 and 311-2.

Figure 4:
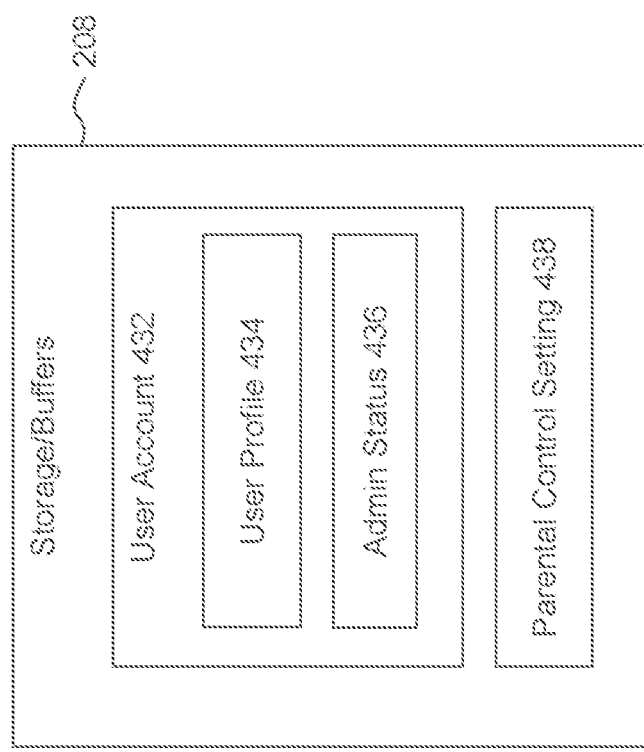
FIG. 4 illustrates a storage module that stores information relating to user accounts and parental control settings, according to some embodiments.

FIG. 4 illustrates storage/buffers 208 that stores information relating to user accounts and parental control settings, according to some embodiments. As shown in FIG. 4, storage/buffers 208 can include user account 432 and parental control setting 438. User account 432 may be shared and accessible among multiple users, such as one or more members of a household. User account 432 can further include user profile 434 and administrator status 436. User profile 434 may be related to all the members of the household. In some embodiments, user profile 434 can include respective user preferences for each member of the household associated with user account 432. User profile 434 can be related to and store information about user settings of media systems 104 and media content by user(s) 132 accessed through user account 432. For example, user profile 434 may include user preferred image properties and sound effects, user's favorite genres, and other user requirements and settings. Additionally, user profile 434 can include identification information of user(s) 132, such as images, gaits, and/or audio recordings of user(s) 132 for user identification. In some embodiments, user profile 434 can include a category for each of user(s) 132. The category of user(s) 132 can include adults, men, women, children under seventeen, children under thirteen, toddlers, a member of household, guests, and other categories. For example, user(s) 132 may be a child, a parent, or a guest. In some embodiments, user profile 434 for children can include the ages of the children. In some embodiments, user profile 434 may further include demographic information of user(s) 132 and other information related to user(s) 132.

Administrator status 436 can include administrator information of user(s) 132. For example, a parent can be an administrator of media device(s) 106 and can have administrator privileges to control the settings of media device(s) 106, such as locking and unlocking a TV, scheduling lock and unlock timings, and changing viewer's mode and other TV settings. In some embodiments, administrator status 436 can include primary administers and secondary administers. For example, a parent can be a primary administer and a grown-up child can be a secondary administer. The primary administers can have administrator privileges for all settings of media device(s) 106. The primary administers can give secondary administrators a subset of the administer privileges for the settings of media device(s) 106.

Parental control setting 438 can include rules to control content to be played on display devices(s) 108. In some embodiments, parental control setting 438 can pause the content played by media device(s) 106 and display a PIN entry prompt to user(s) 132 on display devices(s) 108. In some embodiments, for live content that may not be paused, parental control setting 438 can obscure the content played by media device(s) 106 and display a PIN entry prompt to user(s) 132 on display devices(s) 108. In some embodiments, parental control setting 438 can be set up by user(s) 132 who have administrator privileges according to administrator status 436. In some embodiments, administrator user(s) 132 can set up parental control setting 438 that automatically turns on parental controls when a child is identified within the vicinity of media device(s) 106.

In some embodiments, parental control setting 438 can include a number of tiers of parental control settings based on ages of the children Different tier of parental control setting can have a different priority. For example, a first tier of parental control setting can be set for children five-year old and under, a second tier of parental control setting can be set for children thirteen-year old and under, and a third tier of parental control can be set for children seventeen-year old and under. The first tier of parental control setting can have the highest priority, the second tier of parental control setting can have the medium priority, and the third tier of parental control setting can have the lowest priority. If two or more parental control settings are identified for user(s) 132, parental control setting 438 that has a higher priority among the two or more identified parental control settings can be automatically applied to media device(s) 106.

Automatic Parental Control Based on Identified Audience

FIG. 5 illustrates a block diagram of a system 500 for identifying user(s) 132 and automatically applying parent control settings for identified user(s) 132, according to some embodiments. As shown in FIG. 5, system 500 can include media device(s) 106, speech recognition system 554, natural language understanding system 556, and content server(s) 120. In some embodiments, system 500 can further include display device(s) 108, network 118, remote control 110, and/or system server(s) 126 shown in FIG. 1. Media device(s) 106 can further include sensing module(s) 218, user identification system 546, parental control system 548, and storage/buffers 208. Sensing module(s) 218 can further include MMW sensing module 542 and audio sensing module 544.

MMW sensing module 542 can include one or more millimeter-wave (MMW) sensors to detect audiences, such as user A and user B in FIG. 5, within a vicinity of MMW sensing module 542. MMW sensing module 542 can capture a gait, a heartbeat rate, and/or a respiration of the detected user for identification. The gait can be a person's manner of walking. In some embodiments, the one or more MMW sensors can be integrated in media device(s) 106 and/or display device(s) 108. In some embodiments, the one or more MMW sensors can be stand-alone devices and connected to media device(s) 106 and/or display device(s) 108.

Audio sensing module 544 can include microphones or other audio sensors to detect audiences, such as user A and user B in FIG. 5, within a vicinity of audio sensing module 544. In some embodiments, audio sensing module 544 can include microphone 112 in remote control 110, microphones in display device(s) 108, and/or microphones in any devices used by user(s) 132 to interact with media systems 104. Audio sensing module 544 can capture one or more utterances of the detected users for identification. In some embodiments, while display device(s) 108 are playing back content 122 received from content server(s) 120, MMW sensing module 542 and audio sensing module 544 may continuously or periodically "watch" for object movements and "listen" for voices within the vicinity of media device(s) 106 in order to detect any audiences within the vicinity. In some embodiments, utterance and voice are used interchangeably in the current description to indicate the sound uttered by users within the vicinity.

In some embodiments, one or more user(s) 132, such as users A and B in FIG. 5, have corresponding user account 432 stored in storage/buffers 208. For example, users A and B can be members of a household and user account 432 can include user profile 434 for users A and B. User profile 434 can include categories of users A and B. In some embodiments, administrator status 436 can include administrator status of users A and/or B. Users A and/or B can have administrator privileges if they are administers. In some embodiments, each of users A and B can have corresponding parental control setting 438 according to their respective categories. For example, if user A is a four-year old child, parental control setting 438 for user A can be the first tier and have the highest priority. If user B is a ten-year old child, parental control setting 438 for user B can be the second tier and have the medium priority.

In some embodiments, users A and/or B may not have user account 432 set up in storage/buffers 208. For example, users A and/or B may be guests of one or more members of the household. Users A and B may be guest children or adults and may have no corresponding user account 432. Corresponding parental control setting 438 can be determined for users A and B based on their categories. Though FIG. 5 illustrates two users A and B within the vicinity of media device(s) 106, one or more users may be within the vicinity of media device(s) 106.

User identification system 546 can identify categories of audiences within a vicinity of media device(s) 106, such as user A and user B. Examples of categories include adults, children, and people over or under a certain age. The identification information can include the gait, heartbeat rate, and respiration information captured by MMW sensing module 542, and the utterance information captured by audio sensing module 544. In some embodiments, user identification system 546 can identify user A and user B based on the gait, heartbeat rate, and respiration information captured by MMW sensing module 542. In some embodiments, user identification system 546 can identify user A and user B based on the utterance information captured by audio sensing module 544. In some embodiments, user identification system 546 can include a machine-learning model trained with the gait, heartbeat rate, respiration, and utterance information in user profile 434. In some embodiments, the machine-learning model can be trained with one or more databases having gait, heartbeat rate, respiration, and utterance information. The one or more databases may include gait, heartbeat rate, respiration, and utterance information labeled with categories. The machine-learning model can identify the detected gait, heartbeat rate, respiration, and utterance information captured by sensing module(s) 218 and associate the captured gait, heartbeat rate, respiration, and utterance information with corresponding categories. As a result, user identification system 546 can determine the categories of users for the captured gait, heartbeat rate, respiration, and utterance information using the machine-learning model.

In some embodiments, if user A and user B have corresponding user profile 434 with stored gait, heartbeat rate, respiration, and utterance information, user identification system 546 can identify user A and user B based on the stored information in user profile 434. With identified user profile 434, user identification system 546 can further determine the categories of user A and user B. In some embodiments, if user A and user B have no user account 432 or user account 432 has no gait, heartbeat rate, respiration, and utterance information for user A and user B, user identification system 546 can compare the captured gait, heartbeat rate, respiration, and utterance information with corresponding information in the one or more databases and determine the category for captured gait, heartbeat rate, respiration, and utterance information using the machine-learning model.

In some embodiments, user identification system 546 can identify user A and user B and determine their categories based on one or more of the captured gait, heartbeat rate, respiration, and utterance information for user A and user B. In some embodiments, with more information captured with sensing module(s) 218, user identification system 546 can have improved accuracy in determining categories for detected audiences. For example, MMW sensing module 542 may capture a gait of a short adult coming within the vicinity of media device(s) 106. User identification system 546 may have difficulty to determine the category for the short adult. However, MMW sensing module 542 can capture heart beat rate and respiration information of the short adult. Audio sensing module 544 can capture any utterance of the short adult. With the captured gait, heart beat rate, respiration, and utterance information, user identification system 546 can have improved accuracy in determining the category for the short adult. In another example, if a child is outside the room in which media device(s) 106 are playing a content, a voice of the child may be captured by audio sensing module 544 while MMW sensing module 542 may not capture gait, heart beat rate, or respiration information of the child. User identification system 546 can use the captured gait, heart beat rate, respiration, and utterance information to determine that the child is not within the vicinity of media device(s) 106. In some embodiments, user identification system 546 can use additional information on how user(s) 132 pick up, hold, and/or use remote control 110 to further improve the accuracy in determining categories of user(s) 132.

In some embodiments, sensing module(s) 218 can include additional sensors, such as cameras, infra-red sensors, and touch sensors. User identification system 546 can use one or more captured identification information from sensing module(s) 218. Each of the sensing modules in sensing module(s) 218 may continuously or periodically operate to detect any users within the vicinity of media device(s) 106 and display device(s) 108. In some embodiments, the sensing modules may continuously or periodically operate when display device(s) 108 are playing content. In some embodiments, the sensing modules may continuously or periodically operate when media device(s) 106 and display device(s) 108 are turned off. Accordingly, user identification system 546 can identify any person who comes within the vicinity of media device(s) 106 before media device(s) 106 is turned on.

In some embodiments, parental control system 548 can control the parental control settings on media device(s) 106 and/or display device(s) 108 based on the category of the content to be played by media device(s) 106 and/or display device(s) 108, the category of detected audience, and corresponding parental control setting 438 for the detected audience. In some embodiments, user identification system 546 can determine the category of the detected audience. In some embodiments, parental control system 548 can receive the category of the detected audience from user identification system 546 and determine parental control setting 438 for the detected audience. In some embodiments, parental control system 548 can determine the categories of contents 122-1 and 122-2 according to content category labels 311-1 and 311-2 shown in FIG. 3, respectively. In some embodiments, parental control system 548 can determined the parental control setting for identified audience based on the category of the content to be played by media device(s) 106 and/or display device(s) 108 and automatically apply the determined parental control setting 438 to the content. In some embodiments, parental control system 548 can pause the content played by media device(s) 106 and display a PIN entry prompt to user(s) 132 on display devices(s) 108. In some embodiments, for live content that may not be paused, parental control system 548 can obscure the content played by media device(s) 106 and display a PIN entry prompt to user(s) 132 on display devices(s) 108.

Referring to FIG. 5, parental control system 548 can automatically apply a parental control setting having a higher priority when more than one parental control settings are identified for multiple users, according to some embodiments. For example, if user A is a four-year old child, parental control setting 438 for user A can be the first tier and have the highest priority. If user B is a ten-year old child, parental control setting 438 for user B can be the second tier and have the medium priority. If users A and B both come within the vicinity of media device(s) 106, or user A comes within the vicinity of media device(s) 106 when user B is watching TV on display device(s) 108, parental control system 548 can identify the first and second tires of parental control setting 438 based on the categories of users A and B. Parental control system 548 can further compare the priorities of the identified parental control setting 438 for users A and B and apply parental control setting 438 having a higher priority to media device(s) 106. In this way, parental control system 548 can apply parental control setting 438 for the younger child and media device(s) 106 may not play inappropriate content to any of the children within the vicinity of media device(s) 106.

In some embodiments, parental control system 548 may automatically update parental control setting 438 when additional users come within or some users leave the vicinity of media device(s) 106. For example, if previously-detected children leave the room or the vicinity of media device(s) 106, parental control system 548 may update parental control setting 438 applied on media device(s) 106 based on the remaining users within the vicinity of media device(s) 106.

In some embodiments, speech recognition system 554 can recognize the speech in the one or more utterances captured by audio sensing module 544 and convert the speech into text. In some embodiments, media device(s) 106 can communicate with speech recognition system 554 and receive the text for the one or more utterances capture by audio sensing module 544. In some embodiments, speech recognition system 554 can be included in media device(s) 106 or media systems 104 to recognize the speech in the captured utterances. In some embodiments, speech recognition system 554 can be included in system server(s) 126, such as audio command processing module 130, to communicate with media device(s) 106. In some embodiments, speech recognition system 554 can be a third party system communicating with media device(s) 106.

In some embodiments, natural language understanding system 556 can determine an intent of the detected audiences based on the text converted from the one or more captured utterances. In some embodiments, natural language understanding system 556 can be included in media device(s) 106 or media systems 104 to determine the intent for the captured utterances. In some embodiments, natural language understanding system 556 can be included in system server(s) 126, such as audio command processing module 130, to communicate with media device(s) 106. In some embodiments, natural language understanding system 556 can be a third party system communicating with media device(s) 106. In some embodiments, media device(s) 106 can communicate with natural language understanding system 556 and receive the intent for the captured one or more utterances. In some embodiments, user identification system 546 can determine administrator status 436 of the detected audience. In some embodiments, parental control system 548 can receive administrator status 436 of the detected audience from user identification system 546. If administrator status 436 of the detected audience indicates an administer, parental control system 548 can identify parental control setting 438 based on the determined intent. Parental control system 548 can automatically apply the identified parental control setting 438 to media device(s) 106. In some embodiments, parental control system 548 can use the determined intent to update other settings of media device(s) 106, such as locking and unlocking a TV, scheduling lock and unlock timings, and changing viewer's mode.

Figure 6:
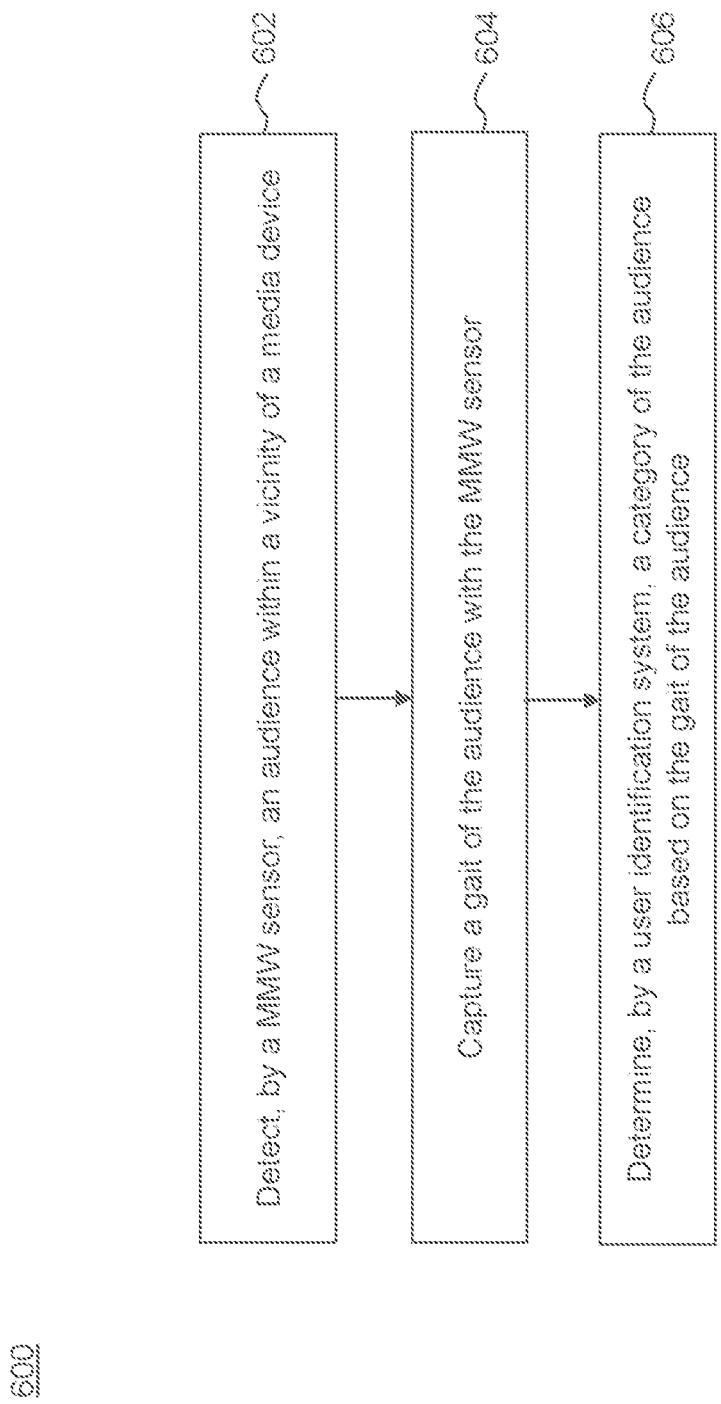
FIG. 6 is a flowchart illustrating a method for determining a category of an audience based on a gait of the audience, according to some embodiments.

FIG. 6 is a flowchart illustrating a method 600 for determining a category of an audience based on captured gait information of the audience, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIG. 5. However, method 600 is not limited to that example embodiment. FIGS. 1-4 illustrate more details of method 600 during the process of determining the category of the audience.

Referring to FIG. 6, in step 602, an audience within a vicinity of a media device is detected by a MMW sensor. For example, as shown in FIG. 5, MMW sensing module 542 can detect user A and user B within the vicinity of media device(s) 106. In some embodiments, MMW sensing module 542 can continuously or periodically "watch" for object movements within the vicinity of media device(s) 106 in order to detect any audiences coming within or leaving the vicinity. In some embodiments, MMW sensing module 542 may be activated only when content is being played by media device(s) 106 and deactivated when content is not being played in order to ensure privacy for users of media device(s) 106.

In step 604, a gait of the audience is captured with the MMW sensor. For example, as shown in FIG. 5, the gait information of users A and B can be captured with MMW sensing module 542. In some embodiments, the captured gait information can be stored in storage/buffers 208. In some embodiments, the captured gait information can be sent to user identification system 546 for audience identification. In some embodiments, MMW sensing module 542 can capture additional information, such as the heartbeat rate, and respiration information, to improve the accuracy of the identification of users A and B.

In step 606, a category of the audience is determined by a user identification system based on the gait of the audience. For example, as shown in FIG. 5, user identification system 546 can determine the categories of users A and B based on the captured gait information of users A and B. In some embodiments, if users A and B include one or more user(s) 132 having corresponding user account 432 with stored gait information of users A and B, user identification system 546 can identify users A and B with a machine-learning method by comparing the captured gait information with the stored gait information in user account 432. Accordingly, user identification system 546 can determine categories of users A and B based on user profile 434 in user account 432. In some embodiments, if users A and B have no stored gait information in user account 432 or users A and B have no user account, user identification system 546 can use the machine-learning model to compare the captured gait information with gait information in one or more databases and determine the categories of users A and B.

Figure 7:
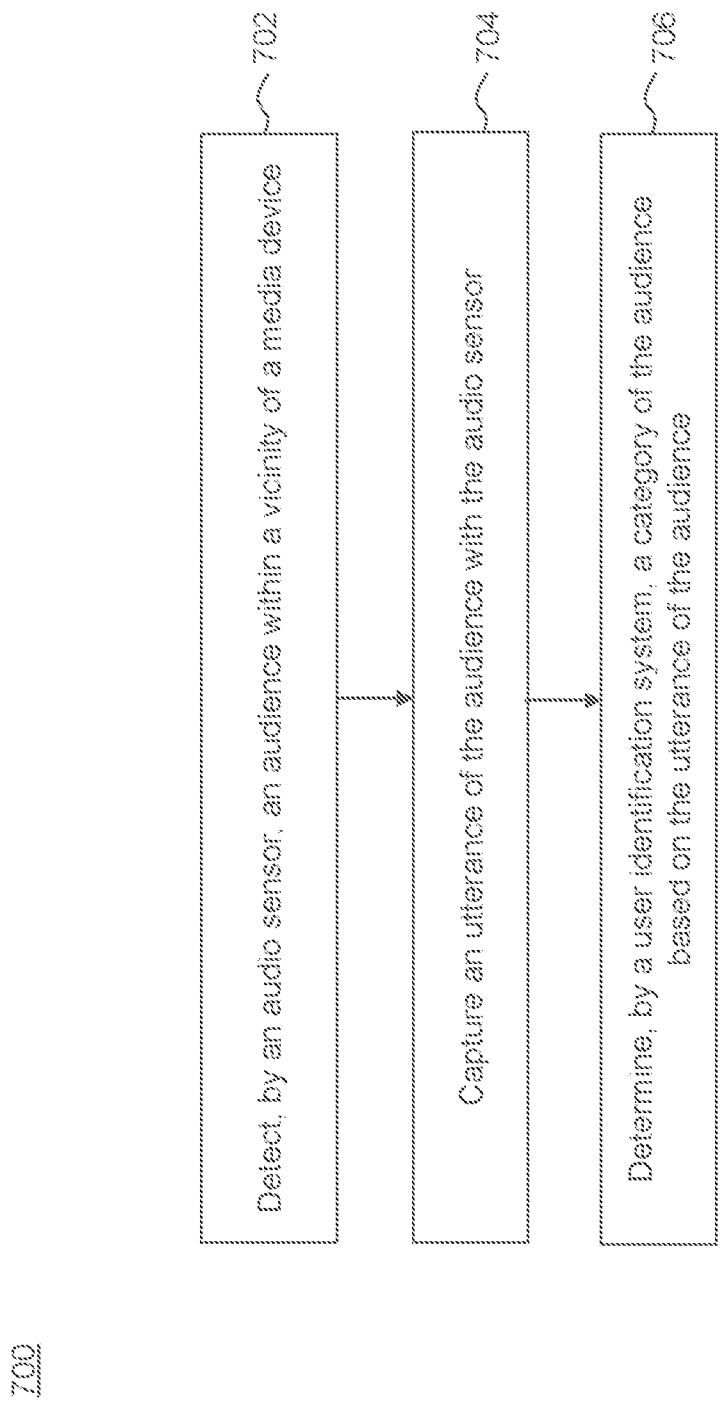
FIG. 7 is a flowchart illustrating a method for determining a category of an audience based on an utterance of the audience, according to some embodiments.

FIG. 7 is a flowchart illustrating a method 700 for determining a category of one or more users in an audience based on captured audio information, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIG. 5. However, method 700 is not limited to that example embodiment. FIGS. 1-4 illustrate more details of method 700 during the process of determining the category of the audience.

Referring to FIG. 7, in step 702, an audience within a vicinity of a media device is detected by an audio sensor. For example, as shown in FIG. 5, audio sensing module 544 can detect user A and user B within the vicinity of media device(s) 106. In some embodiments, audio sensing module 544 can include microphones or other audio sensors to detect users A and B. In some embodiments, audio sensing module 544 can continuously or periodically "listening" for voices within the vicinity of media device(s) 106 in order to detect any audiences within the vicinity while content is being played. In some embodiments, audio sensing module 544 may be activated only when content is being played by media device(s) 106 and deactivated when content is not being played in order to ensure privacy for users of media device(s) 106.

In step 704, an utterance of the audience is captured with the audio sensor. For example, as shown in FIG. 5, one or more utterances of users A and B can be captured with audio sensing module 544. In some embodiments, the captured one or more utterances can be stored in storage/buffers 208. In some embodiments, the one or more utterances can be sent to user identification system 546 for audience identification.

In step 706, a category of the audience is determined by a user identification system based on the utterance. For example, as shown in FIG. 5, user identification system 546 can determine the categories of users A and B based on the captured one or more utterances. In some embodiments, if users A and B include one or more user(s) 132 having corresponding user account 432 with stored audio recordings of users A and B, user identification system 546 can identify users A and B with a machine-learning method by comparing the captured one or more utterances with the stored audio recordings in user account 432. Accordingly, user identification system 546 can determine categories of users A and B based on user profile 434 in user account 432. In some embodiments, if users A and B have no stored audio recordings in user account 432 or users A and B have no user account 432, user identification system 546 can use the machine-learning model to compare the captured one or more utterances with audio recordings in audio recording databases and determine the categories of users A and B.

Figure 8:
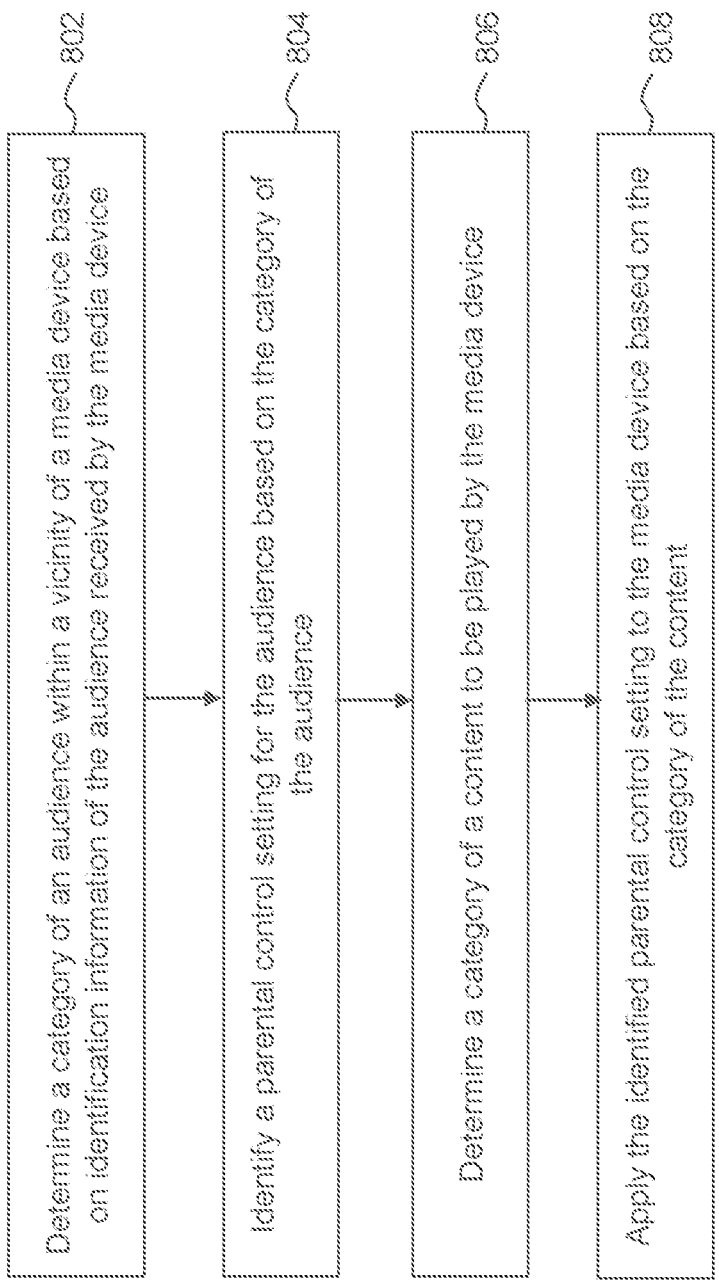
FIG. 8 is a flowchart illustrating a method for automatically applying parental control settings based on an identified audience, according to some embodiments.

FIG. 8 is a flowchart illustrating a method 800 for atomically applying parental control settings based on an identified audience, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 800 shall be described with reference to FIG. 5. However, method 800 is not limited to that example embodiment. FIGS. 1-4 illustrate more details of method 800 during the process of automatic parental controls based on audiences.

Referring to FIG. 8, in step 802, a category of an audience within a vicinity of a media device is determined based on identification information of the audience received by the media device. For example, as shown in FIG. 5, user identification system 546 can determine categories of users A and B within a vicinity of media device(s) 106 based on identification information received by media device(s) 106. In some embodiments, the identification information can include the gait information of users A and B captured by MMW sensing module 542. The process of determining the categories of users A and B based on captured gait information can be illustrated by method 600 in FIG. 6. In some embodiments, the identification information can include one or more utterances of users A and B captured by audio sensing module 544. The process of determining the categories of users A and B based on captured utterances can be illustrated by method 700 in FIG. 7. In some embodiments, user identification system 546 can improve the accuracy of the categories of users A and B with additional information of users A and B, such as the heartbeat rate and respiration information captured by audio sensing module 544. In some embodiments, user identification system 546 can further improve the accuracy of the categories of users A and B with information captured by other sensing modules, such as images sensors, infra-red sensors, and touch sensors. In some embodiments, user identification system 546 can use information on how users A and/or B pick up, hold, and/or use remote control 110 to further improve the accuracy in determining the categories of users A and B.

In step 804, a parental control setting for the audience is identified based on the category of the audience. For example, as shown in FIG. 5, parental control system 548 can identify a parental control setting for users A and B in parental control setting 438 based on the determined categories of users A and B. In some embodiments, if a same category is determined for users A and B, parental control system 548 can identify the corresponding parental control setting. In some embodiments, if multiple categories are determined for users A and B, parental control system 548 may identify multiple tiers of parental control settings for users A and B and choose one parental control setting for media device(s) 106. In some embodiments, each of the multiple parental control settings can have a priority. Parental control system 548 can identify a parental control setting for the category having a higher priority. For example, a category of children under thirteen can have a higher priority than a category of children under seventeen.

In step 806, a category of a content to be played by the media device is determined. For example, as shown in FIG. 5, media device(s) 106 can receive a content from content server(s) 120 to be played on display device(s) 108 and parental control system 548 can determine the category of the content to be played by the media device according to the category label of the content. In some embodiments, the content to be played on display device(s) 108 can be upcoming frames and scenes of the content currently playing on display device(s) 108. In some embodiments, as shown in FIG. 3, the content to be played on display device(s) 108 can include content 122-1 having content category label 311-1 and content 122-2 having content category label 311-2.

In step 808, the identified parental control setting is applied to the media device based on the category of the content. For example, as shown in FIG. 5, parental control system 548 can apply the identified parental setting to media device(s) 106 and/or display device(s) 108. In some embodiments, if content category label 311-1 of content 122-1 is inappropriate for the categories of users A and B, parental control system 548 can apply the identified parental control setting for users A and B, which can pause content 122-1 played by media device(s) 106 and display a PIN entry prompt to the users A and B on display devices(s) 108. In some embodiments, if content category label 311-1 of content 122-1 is inappropriate for the categories of users A and B and content 122-1 is live content, parental control system 548 can apply the identified parental control setting for users A and B, which can obscure content 122-1 played by media device(s) 106 and display a PIN entry prompt to the users A and B on display devices(s) 108. In some embodiments, if category label 311-1 of content 122-1 is inappropriate for the category of the identified the user A but appropriate to the category of the user B, parental control system 548 can apply the parental control setting for users A or B having a higher priority.

In some embodiments, user identification system 546 may continuously or periodically monitor an audience within the vicinity of media device(s) 106 with sensing module(s) 218, even when media device(s) 106 and/or display device(s) 108 are turned off. Parental control system 548 can apply the identified parental control setting to media device(s) 106 when an audience comes within or leaves the vicinity of media device(s) 106. In some embodiments, user identification system 546 may continuously or periodically monitor identification information within the vicinity of media device(s) 106 with sensing module(s) 218 while media device(s) 106 and/or display device(s) are playing the content. Parental control system 548 can apply the identified parental control setting to media device(s) 106. For example, a ten-year old child may have been previously detected in the audience while the content was previously played. While the content is being played, the ten-year old child may then leave the room and only a fifteen-year old child is detected. Parental control system 548 may therefore initially determine to apply a higher priority parental control setting for the ten-year old child to media device(s) 106 but then subsequently determine to apply a lower priority parental control setting for the fifteen-year old child since the ten-year old child is no longer present in the room.

Figure 9:
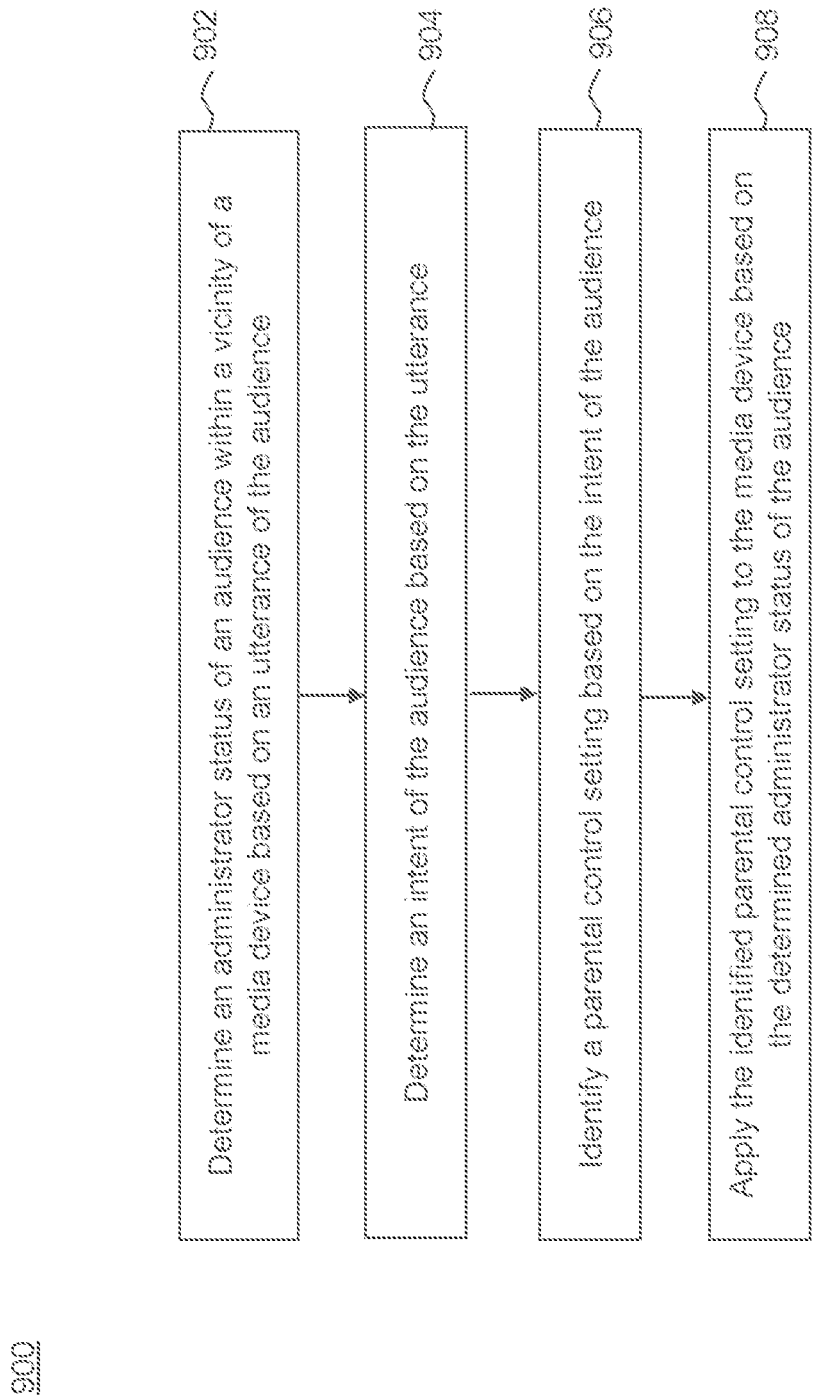
FIG. 9 is a flowchart illustrating a method for automatically applying parental control settings based on an administrator status and an intent of an audience, according to some embodiments.

FIG. 9 is a flowchart illustrating a method 900 for automatically applying parental control settings based on an administrator status and an intent of an audience, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 900 shall be described with reference to FIG. 5. However, method 900 is not limited to that example embodiment. FIGS. 1-4 illustrate more details of method 900 during the process of automatic parental controls based on identified audiences.

Referring to FIG. 9, in step 902, an administrator status of an audience within a vicinity of a media device is determine based on an utterance of the audience. For example, as shown in FIG. 5, user identification system 546 can determine the administrator status of users A and B within a vicinity of media device(s) 106 based on one or more utterances from users A and B. In some embodiments, the one or more utterances of users A and B can be captured by audio sensing module 544. User identification system 546 can identify users A and B and determine administrator status 436 of users A and B according to user account 432. In some embodiments, the process of determining the administrator status of users A and B based on captured utterances can be similar to method 700 in FIG. 7. In some embodiments, the one or more utterances can include an instruction for media device(s) 106 to apply a parental control setting or other TV settings, such as "turn on parental control setting" or "lock TV between 11 PM and 7 AM."

In step 904, an intent of the audience is determined based on the utterance. For example, as shown in FIG. 5, natural language understanding system 556 can determine the intent of the captured one or more utterances from users A and B. In some embodiments, natural language understanding system 556 can determine the intent based on user profile 434 for identified audiences and the text of the one or more utterances converted by speech recognition system 554.

In step 906, a parental control setting is identified based on the intent of the audience. For example, as shown in FIG. 5, parental control system 548 can identify the parental control setting for users A and/or B based on the intent determined by natural language understanding system 556. In some embodiments, in response to an instruction of the captured utterances to apply a parental control setting, parental control system 548 can identify the parental control setting 438 stored in storage/buffers 208. In some embodiments, in response to an instruction of the captured utterances to apply other TV settings, parental control system 548 can identify the other TV setting in storage/buffers 208.

In step 908, the identified parental control setting is applied to the media device based on the determined administrator status of the audience. For example, as shown in FIG. 5, parental control system 548 can apply the identified parental control setting stored in storage/buffers 208 to media device(s) 106 based on determined administrator status 436 of users A and B. In some embodiments, parental control system 548 can apply to media device(s) 106 while a content is being played on display device(s) 108.

Example Computer System

Figure 10:
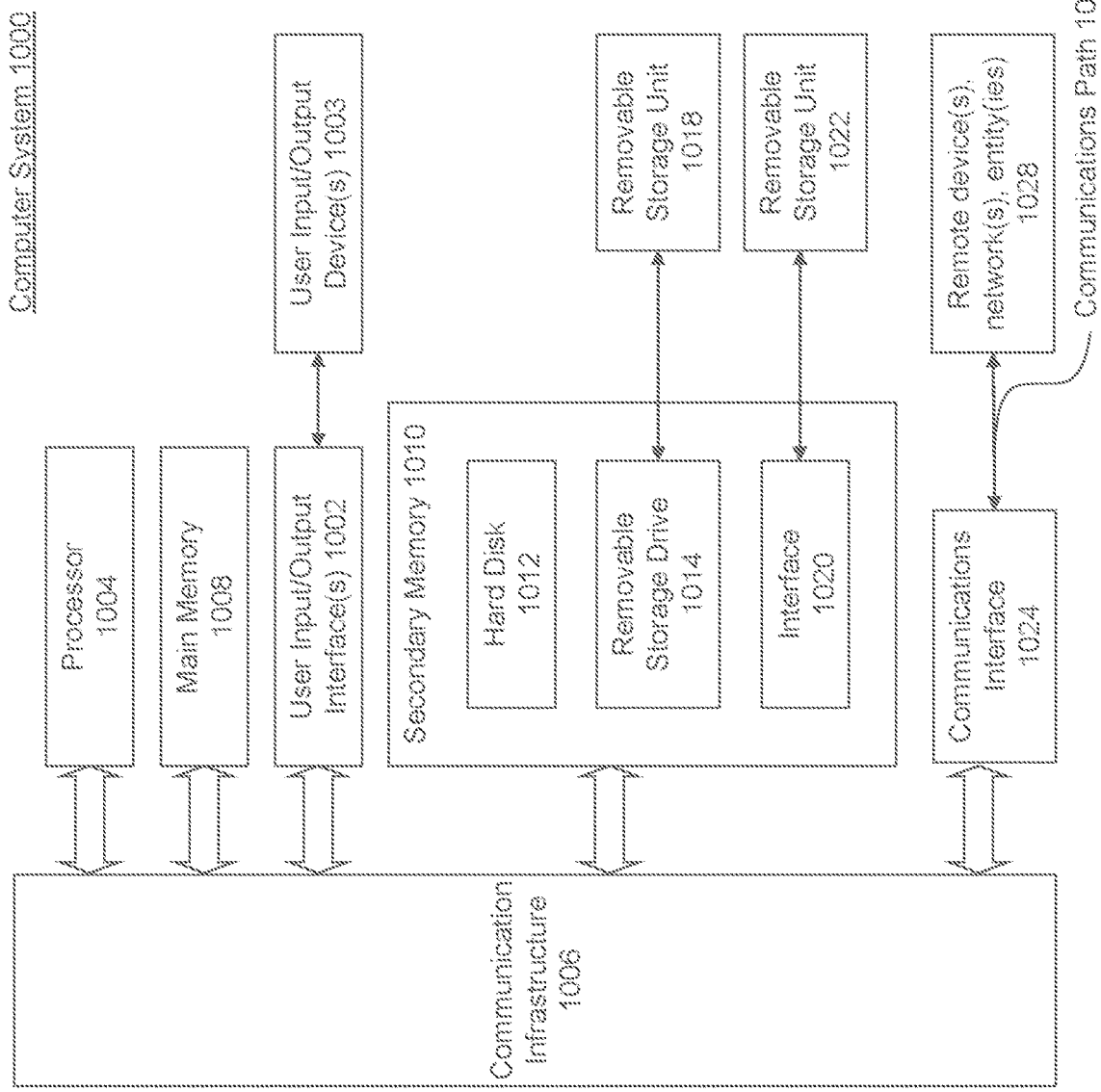
FIG. 10 illustrates an example computer system useful for implementing various embodiments.

Various embodiments may be implemented, for example, using one or more well-known computer systems, such as computer system 1000 shown in FIG. 10. For example, the media device(s) 106 may be implemented using combinations or sub-combinations of computer system 1000. Also or alternatively, one or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000 or processor(s) 1004), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system, comprising:
   a storage module; and
   at least one processor each coupled to the storage module and configured to:
      detect, while a content is being played by a media device, a composition change of an audience within a vicinity of the media device based on identification information of the audience received by the media device;
      determine a category of the composition changed audience with a user identification system based on the identification information;
      identify a parental control setting for the audience based on the category of the audience;
      determine a category of the content being played by the media device; and
      apply the identified parental control setting to the media device based on the category of the content.

2. The system of claim 1, wherein the identification information includes a gait of the audience captured by a millimeter wave sensor.

3. The system of claim 2, wherein to determine the category of the audience with the user identification system, the at least one processor is configured to determine the category of the audience based on the gait of the audience captured by the millimeter wave sensor.

4. The system of claim 1, wherein the identification information includes an utterance of the audience captured by an audio sensor.

5. The system of claim 4, wherein to determine the category of the audience with the user identification system, the at least one processor is configured to determine the category of the audience based on the utterance of the audience.

6. The system of claim 4, wherein the at least one processor is further configured to:
   determine an administrator status of the audience based on the identification information;
   determine, with a natural language understanding system, an intent of the audience based on the utterance; and
   identify the parental control setting based on the administrator status and the intent of the audience.

7. The system of claim 1, wherein the at least one processor is further configured to:
   detect an additional audience within the vicinity of the media device based on additional identification information of the additional audience received by the media device;
   determine an additional category of the additional audience based on the additional identification information; and
   identify an additional parental control setting for the additional audience based on the additional category, wherein the parental control setting has a first tier with a first priority and the additional parental control setting has a second tier with a second priority different from the first priority.

8. The system of claim 7, wherein to apply the parental control setting, the at least one processor is configured to apply the parental control setting with the first tier in response to the first priority being higher than the second priority.

9. The system of claim 1, wherein the parental control setting comprises pausing the content played by the media device and displaying a PIN entry prompt to the audience.

10. The system of claim 1, wherein the parental control setting comprises obscuring the content played by the media device and displaying a PIN entry prompt to the audience.

11. A computer-implemented method, comprising:
    detecting, while a content is being played by a media device, by at least one computer processor, a composition change of an audience within a vicinity of the media device based on identification information of the audience received by the media device;
    determining a category of the composition changed audience with a user identification system based on the identification information;
    identifying a parental control setting for the audience based on the category of the audience;
    determining a category of the content being played by the media device; and
    applying the identified parental control setting to the media device based on the category of the content.

12. The computer-implemented method of claim 11, wherein the identification information includes a gait of the audience captured by a millimeter wave sensor.

13. The computer-implemented method of claim 12, wherein determining the category of the audience with the user identification system comprises determining the category of the audience based on the gait of the audience captured by the millimeter wave sensor.

14. The computer-implemented method of claim 11, wherein the identification information includes an utterance of the audience captured by an audio sensor.

15. The computer-implemented method of claim 14, wherein determining the category of the audience with the user identification system comprises determining the category of the audience based on the utterance of the audience.

16. The computer-implemented method of claim 14, further comprising:
    determining an administrator status of the audience based on the identification information;
    determining, with a natural language understanding system, an intent of the audience based on the utterance; and
    identifying the parental control setting based on the administrator status and the intent of the audience.

17. The computer-implemented method of claim 11, further comprising:
    detecting an additional audience within the vicinity of the media device based on additional identification information of the additional audience received by the media device;
    determining an additional category of the additional audience based on the additional identification information;
    identifying an additional parental control setting for the additional audience based on the additional category, wherein the parental control setting has a first tier with a first priority and the additional parental control setting has a second tier with a second priority different from the first priority; and
    applying the identified parental control setting with the first tier in response to the first priority being higher than the second priority.

18. A non-transitory computer-readable medium having instructions stored thereon that, when executed by at least one computing device, cause the at least one computing device to perform operations comprising:

detecting, while a content is being played by a media device, a composition change of an audience within a vicinity of the media device based on identification information of the audience received by the media device;

determining a category of the composition changed audience with a user identification system based on the identification information;

identifying a parental control setting for the audience based on the category of the audience;

determining a category of the content being played by the media device; and applying the parental control setting to the media device based on the category of the content.

19. The non-transitory computer-readable medium of claim 18, wherein:

the identification information includes a gait of the audience captured by a millimeter wave sensor; and determining the category of the audience with the user identification system comprises determining the category of the audience based on the gait of the audience captured by the millimeter wave sensor.

20. The non-transitory computer-readable medium of claim 18, wherein:

the identification information includes an utterance of the audience captured by an audio sensor; and determining the category of the audience with the user identification system comprises determining the category of the audience based on the utterance of the audience.

* * * * *